United States Patent [19]

Kanaka et al.

[11] Patent Number: 5,179,192

[45] Date of Patent: Jan. 12, 1993

[54] POLYESTER WHICH EXHIBITS MELT ANISOTROPY

[75] Inventors: Keiichi Kanaka; Noriyuki Hayashi; Toshihiro Kobashi; Yukihiko Kageyama; Kenji Hijikata, all of Shizuoka, Japan

[73] Assignee: Polyplastics Co., Ltd., Osaka, Japan

[21] Appl. No.: 763,245

[22] Filed: Sep. 20, 1991

[30] Foreign Application Priority Data

Sep. 20, 1990 [JP] Japan ................... 2-251334

[51] Int. Cl.$^5$ ............. C08G 63/00; C08G 63/02; C08G 63/18

[52] U.S. Cl. ................ 528/272; 524/601; 524/605; 528/176; 528/190; 528/193; 528/194; 528/271

[58] Field of Search ............. 524/601, 605; 528/176, 528/190, 193, 194, 271, 272

[56] References Cited

U.S. PATENT DOCUMENTS

| | | | |
|---|---|---|---|
| 4,067,852 | 1/1978 | Calundann | 528/190 |
| 4,083,829 | 4/1978 | Calundann et al. | 528/176 |
| 4,118,372 | 10/1978 | Schaefgen | 528/190 |
| 4,130,545 | 12/1978 | Calundann | 524/604 |
| 4,181,792 | 1/1980 | Jackson, Jr. et al. | 528/190 |
| 4,219,461 | 8/1980 | Calundann | 528/173 |
| 4,256,624 | 3/1981 | Calundann | 524/599 |
| 4,318,841 | 3/1982 | East et al. | 524/605 |
| 4,337,191 | 6/1982 | Favstritsky | 524/599 |
| 4,375,530 | 3/1983 | Hay et al. | 524/605 |
| 4,431,770 | 2/1984 | East et al. | 524/599 |
| 4,473,682 | 9/1984 | Calundann et al. | 524/605 |
| 4,684,712 | 8/1987 | Ueno et al. | 528/190 |
| 4,746,694 | 5/1988 | Charbonneau et al. | 524/602 |
| 4,983,713 | 1/1991 | Hayashi et al. | 528/190 |
| 5,015,722 | 5/1991 | Charbonneau et al. | 528/190 |
| 5,055,546 | 10/1991 | Sugimoto et al. | 528/190 |

*Primary Examiner*—John Kight, III
*Assistant Examiner*—T. Mosley
*Attorney, Agent, or Firm*—Burns, Doane, Swecker & Mathis

[57] ABSTRACT

An improved polyester exhibiting melt anisotropy and excellent thermal stability is provided which consists essentially of the structural units (I) to (III) wherein:

(I) is 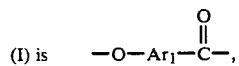

(II) is 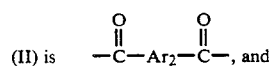 , and (III) is 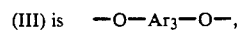 , wherein $Ar_1$ is 1,4-phenylene, $Ar_2$ is a mixed system of 2,6-naphthalene and 2,7-naphthalene, and $Ar_3$ is an aromatic ring containing 6 or more carbon atoms, the unit (I) accounting for 15 to 90 mole percent and the unit (II) for 20 to 70 mole percent of the total amount of the structural units, and the percentage of 2,7-naphthalene to the total amount of $Ar_2$ in the unit (II) being between 10 and 90 mole percent.

19 Claims, No Drawings

POLYESTER WHICH EXHIBITS MELT ANISOTROPY

This invention relates to a polyester which exhibits melt anisotropy and possesses excellent thermal stability and processability.

BACKGROUND OF THE INVENTION

Polyester which exhibits melt anisotropy is easy to shape despite its high heat resistance, and therefore has found widespread use since its invention by Mr. J. Economy and his coworkers. More recently, the polymer skeleton has been tailored to suit varied applications, resulting in diversification of polymers in their use. Difficulties are involved, however, in designing those polymers, especially with a good balance between thermal stability and processability. Approaches to the problem have been made through various combinations of mesogens and soft spacers, but none have proven to be completely satisfactory to date.

SUMMARY OF THE INVENTION

The present inventors have carried out intensive research on designs for a polyester which exhibits melt anisotrop and is balanced well between thermal stability and processability. They have now found, as a result, that a combination of certain polymer structural units gives desirable properties. The present invention has been based upon this finding.

Thus, the invention provides a polyester which exhibits melt anisotropy, consisting essentially of structural units represented by the formulas (I) to (III), where:

(I) is 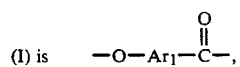

(II) is 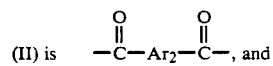, and (III) is 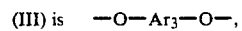, and wherein $Ar_1$ is 1,4-phenylene, $Ar_2$ is a mixed system of 2,6-naphthalene and 2,7-naphthalene, and $Ar_3$ is an aromatic ring containing 6 or more carbon atoms, the unit (I) accounting for 15 to 90 mol % and the unit (II) for 20 to 70 mol% of the total amount of the structural units, the percentage of 2,7-naphthalene to the total amount of $Ar_2$ in the unit (II) being between 10 and 90 mol %.

Of the structural units defined above, the unit (III) comprises $Ar_3$ which is preferably one or more members selected from among 1,4-phenylene, 1,4-phenylene having a substituent in any other position, 2,6-naphthalene, 2,7-naphthalene, 4,4'-biphenylene, and 4,4'-biphenylene propane, still preferably 1,4-phenylene, 2,6 naphthalene, or 4,4'-biphenylene.

The structural unit of the formula (I) should account for 15 to 90 mol % of the total amount of the structural units. The unit, if used in an amount outside this range, will impair the processability. Its percentage is preferably 20 to 85 mol %, still preferably 30 to 70 mol %. If desired, it is possible to use a small amount (0.1 to 10 mol % of the total structural units) of an additional structural unit represented by the formula (IV)

(IV) 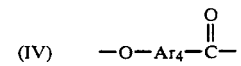

in which $Ar_4$ is 2,6-naphthalene.

The structural unit of the formula (II) should amount to 20 to 70 mol %, preferably 30 to 70 mol %, of the total amount of the structural units. In the formula (II), 2,7 naphthalene in $Ar_2$ should not exceed 90 mol % and be not less than 10 mol % of the total $Ar_2$ amount. If it is outside this range, the melt flow properties are unfavorably affected and the processability is impaired. A preferred range is between 80 and 20 mol %.

The monomers which yield the units of formulas (I), (II), and (III) are typified by the following.

The monomers of formula (I) are, for example, p-hydroxybenzoic acid and its derivatives such as p-acetoxybenzoic acid, phenyl p-hydroxybenzoate, and methyl p-hydroxybenzoate. The naphthalene compounds of the formula (IV) that may be added when desired include 2,6-hydroxynaphthoic acid and its derivatives such as 2,6-acetoxynaphthoic acid, phenyl 2,6-hydroxynaphthoate, and methyl 2,6-hydroxynaphthoate.

Examples of the monomers of formula (II) are 2,6-naphthalenedicarboxylic acid, 2,7-naphthalenedicarboxylic acid, and their derivatives such as phenyl-2,6-naphthalenedicarboxylate, phenyl2,7-naphthalenedicarboxylate, dimethyl-2,6-naphthalenedicarboxylate, and dimethyl-2,7-naphthalenedicarboxylate.

Among the monomers of formula (III) are hydroquinone, 2,6-naphthalenediol, 2,7-naphthalenediol, 4,4'-biphenol, 4,4'-dihydroxybiphenylpropane and their derivatives such as diacetoxy compounds.

The polymer according to the invention is made from these compounds by direct polymerization or transesterification. The polymerization is usually conducted by solution polymerization, slurry polymerization, melt polymerization, or other similar techniques.

Various catalysts may be employed for the polymerization. Typical of them are dialkyltin oxides, diaryltin oxides, titanium dioxide, alkoxy-titanium silicates, titanium alcoholates, alkali and alkaline earth metal salts of carboxylic acids, and Lewis acids such as $BF_3$.

The amount of the catalyst to be used is usually about 0.001 to about 1% by weight, preferably about 0.01 to about 0.2% by weight, on the basis of the total monomer weight.

The polymer prepared by the abovementioned polymerization procedure may further be subjected to solid phase polymerization, which involves heating under reduced pressure or in an inert gas, for increasing the molecular weight.

To be a liquid crystal polymer which exhibits optical anisotropy when melted is an indispensable factor for the polymer of the invention to have both thermal stability and processability. The melt anisotropic property can be confirmed by a conventional polarimetric method using a crossed nicol polarizer. More specifically, melt anisotropy is proven by melting a sample placed on a Leitz hot stage and observing the melt in a nitrogen atmosphere under a Leitz polarization microscope at a magnification of 40×. The above polymer is optically anisotropic and allows light transmission through it when placed between the crossed polarizers. Polarized light passes through the sample when the latter is optically anisotropic, even though kept still in a molten state.

Possible criteria of processability for the product of the invention are liquid crystallinity and the melting point (the temperature at which liquid crystallinity is first exhibited). Whether the product shows liquid crystallinity or not depends largely upon its melt flow properties. It is essential for the polyester of the invention to exhibit liquid crystallinity when melted.

Nematic liquid crystal polymers are extremely reduced in viscosity above the melting point. In general, therefore, it is an indication of processability that a polymer becomes liquid crystalline at or above its melting point. From the viewpoint of heat resistance, the melting point (at which liquid crystallinity develops) is desired to be as high as possible. Actually, a desirable level is 350° C. or below when factors such as the thermal deterioration during melting of the polymer and the heating capacity of a molding machine are taken into account. More desirably, the melting point is 300° C. or below. It is also desirable that the melt viscosity of the resin at a temperature of the melting point plus at least 10° C. be $1 \times 10^6$ poises or below under a shear stress of 100 $\sec^{-1}$. Preferably the viscosity is $10^4$ poises or below. Such a melt viscosity generally is realized by the provision of liquid crystallinity.

The polyester of the invention may contain various inorganic and organic fillers in fibrous, granular, particulate, flaky, or platy form, depending on the intended use.

Examples of the fibrous fillers are inorganic fibrous substances such as the fibers of glass, asbestos, silica, silica-alumina, alumina, zirconia, boron nitride, silicon nitride, boron, and potassium titanate; and also metallic fibrous substances such as the fibers of stainless steel, aluminum, titanium, copper, and brass. The most typical fibrous filler is glass fiber. High-melting organic fibrous substances of polyamides, fluororesins, polyester resins, acrylic resins, etc., may be used as well.

The granular or particulate fillers include carbon black, graphite, silica, quartz powder, glass beads, milled glass fiber, glass balloons, glass powder, and silicates such as calcium silicate, aluminum silicate, kaolin, talc, clay, diatom earth and wollastonite; iron oxide, titanium oxide, zinc oxide, antimony trioxide, alumina, and other metal oxides; carbonates of metals, such as calcium carbonate and magnesium carbonate; sulfates of metals, such as calcium sulfate and barium sulfate; and also ferrites, silicon carbide, silicon nitride, boron nitride, and various metal powders.

The flaky or plate fillers include mica, glass flakes, and various metal foils.

Among exemplary organic fillers are aromatic polyester fibers, liquid crystal polymer fibers, aromatic polyamide and polyimide fibers, and other heat-resistant, high-strength synthetic fibers.

These organic and inorganic fillers can be used singly or in a combination of two or more. A combination of a fibrous filler with a granular or flaky filler is particularly desirable because it combines mechanical strength, dimensional accuracy, electrical properties, etc. The amount of the inorganic filler or fillers is not more than 95% by weight, preferably 1 to 80% by weight, on the basis of the total amount of the composition.

In using such a filler or fillers, it is desirable, where necessary, to use also a binder or surface treatment.

The polyester according to the invention may further contain as an auxiliary component another thermoplastic resin provided it is not detrimental to the realization of the object of the invention.

Examples of the thermoplastic resins useful for this purpose are polyolefins such as polyethylene and polypropylene; aromatic polyesters composed of a diol and an aromatic dicarboxylic acid such as polyethylene terephthalate or polybutylene terephthalate; and polyacetals (homo- or copolymers), polystyrenes, polyvinyl chlorides, polyamides, polycarbonate, ABS, polyphenylene oxides, polyphenylene sulfides, and fluororesins. These thermoplastic resins may be used also as a mixture of two or more.

Effect of the Invention

The aromatic polyester which is composed of specific structural units and which exhibits melt anisotropy and its composition obtained in accordance with the invention have such desirable melt fluidity and such excellent thermal stability that they can be injection molded, extruded, or compression molded into various three-dimensional moldings, fibers, films, etc. In particular, the invention imparts adequate fluidity for injection molding.

A good balance between thermal stability and other properties make the products according to the invention suitable as precision parts, especially narrow-pitch connectors, thin-walled components, electric wire and cable coverings, etc.

Examples

The present invention is illustrated by the following Examples which are not intended to be limiting.

Example 1

As shown in Table 1, 60 mol % of p-acetoxybenzoic acid, 10 mol % each of a 2,6 naphthalenedicarboxylic acid and a 2,7-naphthalenedicarboxylic acid, 20 mol % of 4,4'-diacetoxybiphenyl, and 0.05% by weight of potassium acetate on the basis of the total amount of the feed were fed into a reactor equipped with an agitator, nitrogen supply line, and distilling tube. The mixture was heated in a stream of nitrogen up to 260° C. over one hour. While acetic acid was distilled out of the reactor, the heating was continued at 260 to 300° C. for two hours and further at 300° C. for two hours, and acetic acid was distilled out under reduced pressure (2 mmHg). Then, nitrogen was introduced and the reaction mixture was cooled down to room temperature.

The polymer thus obtained was lightly yellow and milk white. Its melting point as measured with a differential thermal analyzer manufactured byMAC Science Co.,Ltd was 285° C. The polymer as heated on a hot stage was observed under a Leitz polarization microscope. It showed a nematic liquid crystal pattern above its melting point. The temperature at which a viscosity of $10^4$ poises was reached under a shear stress of $10^{-2}$ sec was measured with a Capirograph manufactured by Toyo Seiki Seisaku-Sho to be 290° C.

The polymer was melt extruded at 290° C. through a single-orifice spinning nozzle into a monofilament and rapidly cooled in air. It was wound up at a spinning speed of 4500 m/min. The filament, when tested on a tensile tester, showed a tensile strength of 7.4 g/denier, tensile modulus of 379 g/denier, and percentage elongation of 2.7%.

Tensile test pieces were made from this polymer and tested at 290° C. using a tester "Minishot Model 2" manufactured by Yokohama Chemix Co., Ltd. The tensile strength was 1121 kg/cm², tensile modulus 69000 kg/cm², and the elongation was 2.7%.

the resulting resin composition and evaluated. The results are given in Table 1.

TABLE 1

| | Monomer composition* (mol %) | | | | Tm (°C.) | Temp. at which melt vis. of 10⁴ poises was reached (°C.) | Tensile strength (kg/cm²) | Tensile modulus (kg/cm²) | Percent. elong. (%) | Remarks |
|---|---|---|---|---|---|---|---|---|---|---|
| | (I) | (IV) | (II) | | (III) | | | | | | |
| Ex. 1 | HBA 60 | — | 2, 6NDA 10 | 2, 7NDA 10 | BP 20 | 285 | 290 | 1121 | 69000 | 2.7 | |
| Ex. 2 | HBA 60 | HNA 2 | 2, 6NDA 10 | 2, 7NDA 9 | BP 19 | 260 | 264 | 1151 | 70000 | 2.5 | |
| Ex. 3 | HBA 60 | HNA 2 | 2, 6NDA 10 | 2, 7NDA 9 | HQ 19 | 277 | 282 | 972 | 77000 | 2.0 | |
| Ex. 4 | HBA 60 | HNA 2 | 2, 6NDA 10 | 2, 7NDA 9 | DHN 19 | 240 | 244 | 1048 | 67000 | 3.5 | |
| Ex. 5 | HBA 60 | HNA 2 | 2, 6NDA 5 | 2, 7NDA 15 | BP 20 | 276 | 285 | 855 | 52000 | 2.5 | |
| Ex. 6 | HBA 60 | — | 2, 6NDA 10 | 2, 7NDA 10 | HQ 20 | 290 | 296 | 1258 | 84000 | 2.0 | |
| Ex. 7 | HBA 60 | — | 2, 6NDA 10 | 2, 7NDA 10 | DHN 20 | 265 | 270 | 1212 | 80000 | 2.0 | |
| Comp. Ex. 1 | HBA 60 | — | 2, 6NDA 20 | — | BP 20 | 355 | — | — | — | — | decomp. gas developed during production, and product browned. |
| Comp. Ex. 2 | HBA 60 | — | — | 2, 7NDA 20 | BP 20 | 320 | — | — | — | — | briskly gave off decomp. gas during production, and ordinary polymerization impossible by extreme thickening. |
| Ex. 8 | Polyester of Ex. 6 with 30 wt % glass fiber. | | | | | | | 1570 | 205000 | 1.7 | |

*HBA = p-acetoxybenzoic acid
HNA = hydroxynapthoic acid
2, 6NDA = 2,6-naphthalenedicarboxylic acid
2, 7NDA = 2,7-naphthalenedicarboxylic acid
BQ = 4,4'-diacetoxybiphenyl
HQ = hydroquinone
DHN = naphthalenediol Examples 2 to 7

Generally following the procedure of Example 1, mixtures of the formulations listed in Table 1 were separately polymerized and the resultant polymers were tested in the same way. Test pieces were prepared at a temperatures at which the viscosity of 10⁴ poises was reached. The results are given in Table 1.

Comparative Example 1

The mixture shown in Table 1 was polymerized generally in the same manner as the one in Example 1. It was heated at 260° to 300° C. for two hours and further at 300° to 360° C. for two hours. Acetic acid was distilled out in a vacuum and a decomposition gas developed. The product was brownish and its surface conditions were not found desirable.

Comparative Example 2

Generally the same procedure as the one in Example 1 was followed to carry out the polymerization of the mixture shown in Table 1. The mixture was heated at 260 to 300° C. for two hours, and pressure reduction was started while it was further heated at 300 to 320° C. for one hour, when a decomposition gas developed briskly. Agitation thickened the melt to such a degree that ordinary polymerization could scarcely take place. The product was brownish, hard and brittle.

Example 8

The liquid crystal polyester of Example 6 was blended with 30% by weight (on the basis of the total composition) of glass fiber. Test pieces were made from Although the invention has been described with preferred embodiments it is to be understood that variations and modifications may be employed without departing from the concept of the invention as defined in the following claims.

We claim:

1. A polyester which exhibits melt anisotropy consisting essentially of the structural units represented by the formulas (I) to (III), where:

(I) is 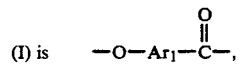, (II) is 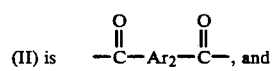, and (III) is 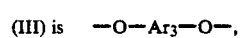, and wherein Ar₁ is 1,4-phenylene, Ar₂ is a mixture of 2,6-naphthalene and 2,7-naphthalene, and Ar₃ is an aromatic ring containing 6 or more carbon atoms, the unit (I) accounting for 15 to 90 mole percent and the unit (II) for 20 to 70 mole percent of the total amount of the structural units, and the quantity of 2,7-naphthalene to the total amount of Ar₂ in the unit (II) being between 10 and 90 mole percent.

2. A polyester of claim 1 which further comprises a structural unit represented by the formula

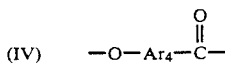

wherein Ar₄ is 2,6-naphthalene, in an amount of 0.1 to 10 mole percent of the total amount of the structural units.

3. A polyester of claim 1 wherein Ar₃ of unit (III) is selected from the group consisting of 1,4-phenylene, substituted 1,4-phenylene, 2,6-naphthalene, 2,7-naphthalene, 4,4'-biphenylene, 4,4'-biphenylenepropane, and mixtures thereof.

4. A polyester of claim 1 wherein Ar₃ of unit (III) is 4,4'-biphenylene.

5. A polyester of claim 1 wherein Ar₃ of unit (III) is 1,4-phenylene.

6. A polyester of claim 1 wherein Ar₃ of unit (III) is 2,6-naphthalene.

7. A polyester of claim 1 wherein Ar₃ of unit (III) is 2,7-naphthalene.

8. A polyester of claim 1 which exhibits melt anisotropy at 350° C. or below.

9. A polyester of claim 2 which exhibits melt anisotropy at 350° C. or below.

10. A polyester of claim 1 wherein unit (I) is present in an amount of 20 to 85 mole percent of the total amount of structural units.

11. A polyester of claim 1 wherein unit (I) is present in an amount of 30 to 70 mole percent of the total amount of structural units.

12. A polyester of claim 1 wherein unit (II) is present in an amount of 30 to 70 mole percent of the total amount of structural units.

13. A polyester of claim 1 wherein 2,7-naphthalene constitutes between 20 and 80 percent of the total amount of Ar₂ in unit (II).

14. A polyester of claim 2 wherein unit (IV) is present in a concentration of 2 mole percent of the total amount of structural units.

15. A polyester of claim 1 which has incorporated therein a filler in an amount of not more than 95 percent by weight based upon the total weight of the composition.

16. A polyester of claim 1 which has incorporated therein a filler in an amount of 1 to 80 percent by weight based upon the total weight of the composition 17. A polyester of claim 15 wherein the filler is glass fiber.

18. A polyester of claim 16 wherein the filler is glass fiber.

19. A polyester of claim 1 which has incorporated therein glass fiber in an amount of 30 percent by weight based upon the total weight of the composition.

* * * * *